Oct. 7, 1930.  A. S. RIDLEY  1,777,417
PEACH PITTING MACHINE
Filed Jan. 11, 1928  3 Sheets-Sheet 1

INVENTOR
ALBERT STANLEY RIDLEY.
BY Arthur L. Slee
ATTY.

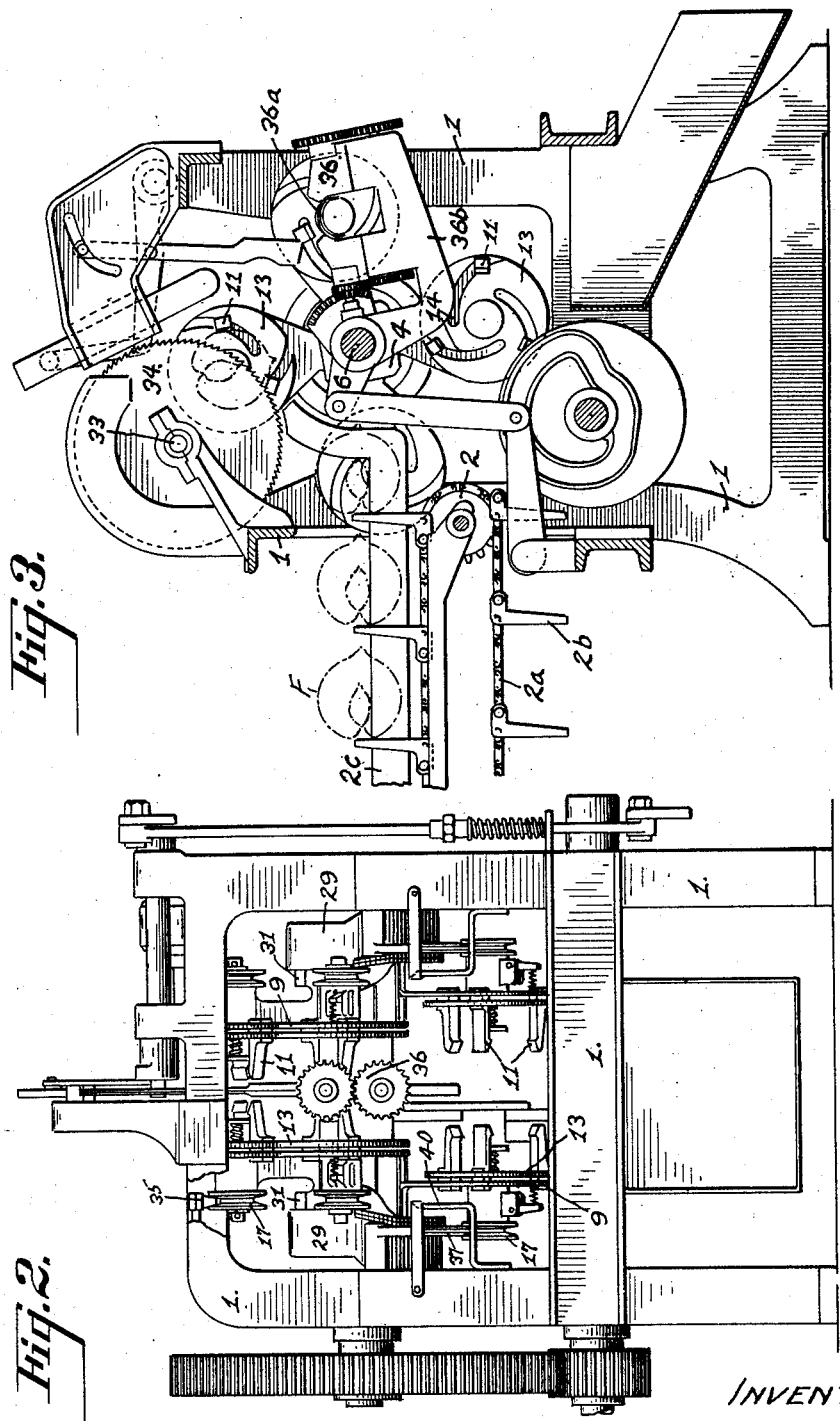

Oct. 7, 1930.　　　　A. S. RIDLEY　　　　1,777,417
PEACH PITTING MACHINE
Filed Jan. 11, 1928　　　3 Sheets-Sheet 3
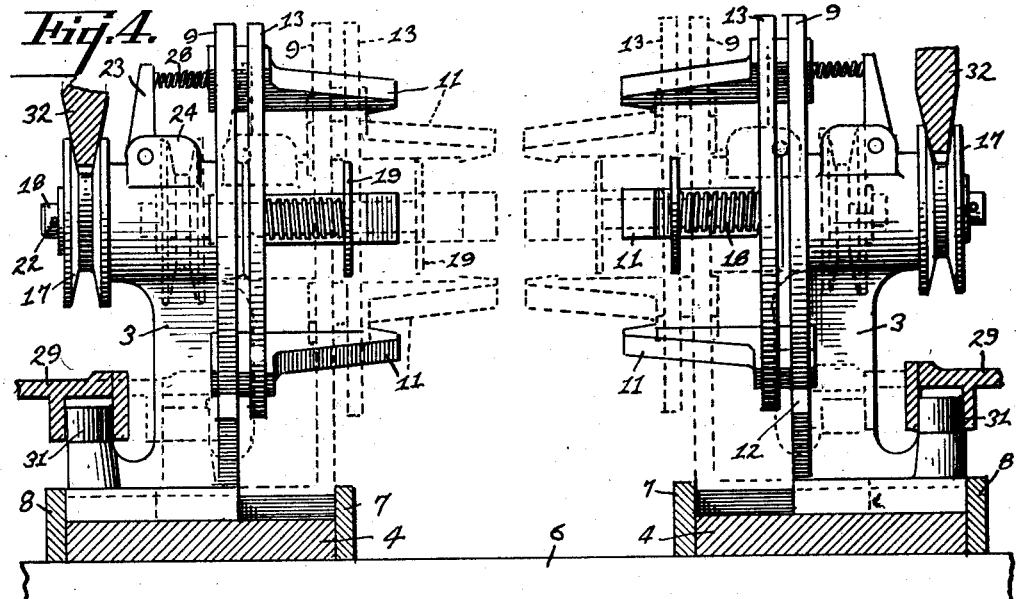
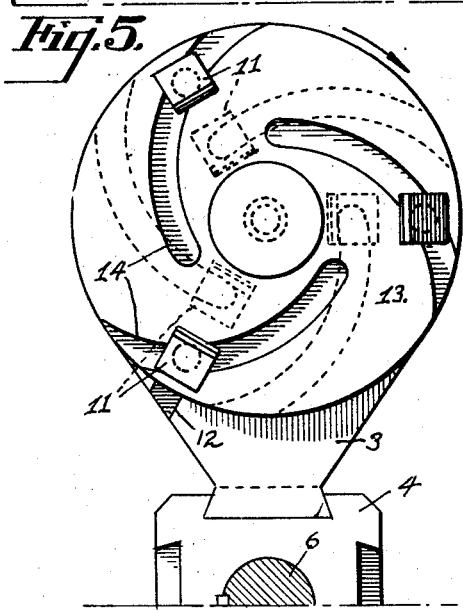
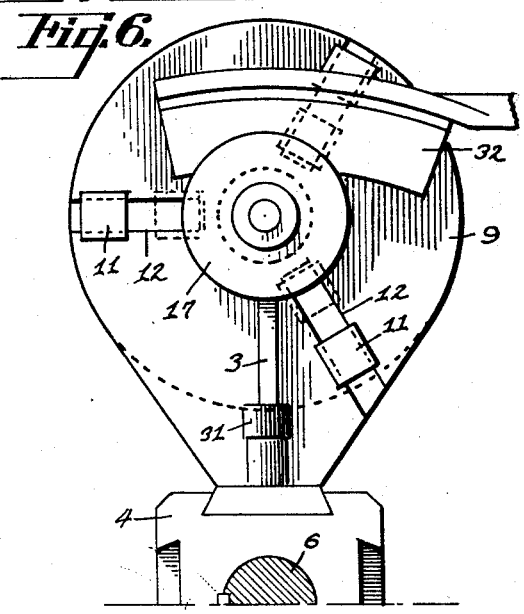
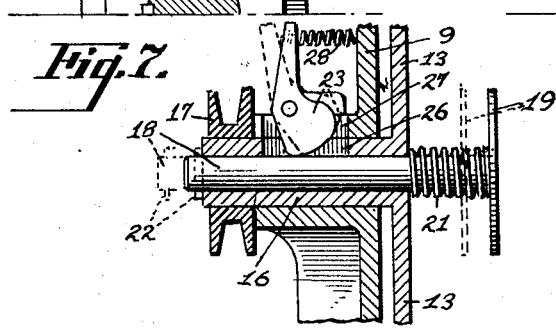
INVENTOR
ALBERT STANLEY RIDLEY
BY *Arthur L. Lee*
ATTY.

Patented Oct. 7, 1930

1,777,417

UNITED STATES PATENT OFFICE

ALBERT STANLEY RIDLEY, OF HAYWARDS, CALIFORNIA, ASSIGNOR TO AUSTRALASIAN MACHINES PROPRIETARY LTD., OF MELBOURNE, AUSTRALIA

PEACH-PITTING MACHINE

Application filed January 11, 1928. Serial No. 245,986.

My invention relates to improvements in pitting machines for peaches and the like wherein fruit fed to a carrier is moved past fruit halving means and the halves firmly held in natural relation while the pit is removed therefrom.

The present invention relates particularly to improvements upon the machines disclosed in my co-pending application, Serial Number 227,259, filed October 19, 1927, and the joint application of Arthur Talbot Tottenham and myself, Serial Number 162,308, filed Jan. 20, 1927, and is directed particularly to improvements in the form, construction, and operation of the fruit carrying and gripping means and fruit severing means.

The primary object of the invention is to provide improved mechanism for gripping fruit and holding the same in natural relation while the pit is being removed therefrom.

Another object is to provide an improved machine wherein the fruit is entirely severed through both the pulp and pit before being presented to the pit removing means to facilitate the removal of the pit and to permit the efficient removal of the halves of naturally split pits.

A further object is to provide an improved construction whereby the severed halves of fruit are pressed together and held in natural relation when presented to the pit removing mechanism.

A further object is to provide an improved structure having means for ejecting the fruit from the gripping means after the pit has been removed to facilitate and quicken the release of the fruit.

I accomplish these and other objects by means of the improved device disclosed in the drawings forming a part of the present application wherein like characters of reference are used to designate similar parts throughout the specification and drawings, and in which—

Fig. 2 is a side elevation of the machine;

Fig. 3 is a transverse vertical mid-section;

Fig. 4 is a detail, partly in section of my improved fruit gripping means;

Fig. 5 is an elevation showing the inner end of the gripping means;

Fig. 6 is an elevation showing the outer end of the gripping means; and

Fig. 7 is a sectional detail of the plunger locking means.

Figure 1:
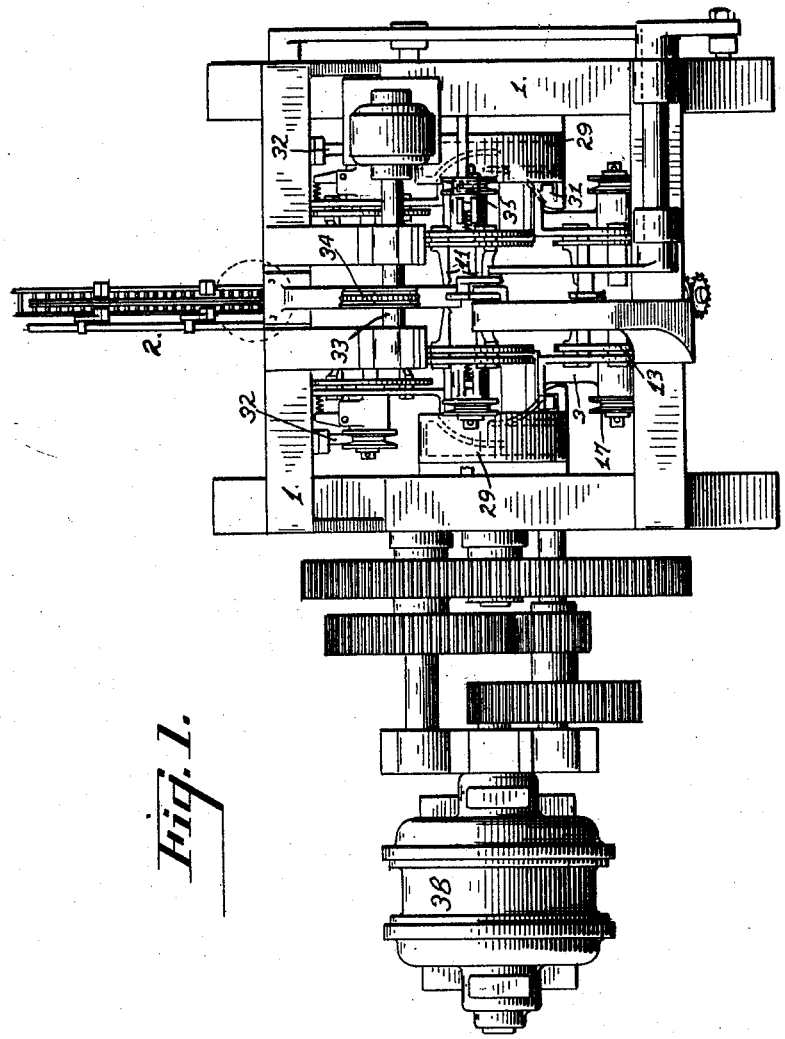
Fig. 1 is a plan view of my improved machine.

Referring to the drawings, the numeral 1 is used to designate in general a frame upon one side of which is mounted a suitable feeding means designated in general by the numeral 2. The feeding means 2 may be of any desired form and arrangement, a construction being illustrated wherein an endless conveyor chain $2^a$ provided with arms $2^b$ mounted for movement adjacent a stationary blade $2^c$. Fruit F is passed onto the blade $2^c$ in the desired position and the movement of the chain $2^a$ causes the arms $2^b$ to engage and move the fruit along the blades $2^c$ and into the machine.

Fruit gripping and carrying means are arranged to pick up the fruit from the feeding means. The gripping and carrying means consists of a plurality of carrier arms 3 slidably dovetailed onto mounting hubs 4 keyed in spaced relation upon a shaft 6 extending between the ends of the frame 1, the arms 3 carried by one hub 4 being disposed directly opposite a corresponding arm upon the other hub 4. Discs 7 and 8 limit the inward and outward sliding movement of the arms 3 upon the hubs 4.

Gripper plates 9 are secured upon the outer ends of the arms 3, the plate carried by each arm being arranged to face the plate upon the opposite arm. A set of three gripper fingers 11 are slidably mounted in radial slots 12 formed upon the face of each plate 9. Finger actuating cam plates 13 are mounted adjacent the face of each gripper plate 9, said plates 13 having spirally disposed slots 14 formed therein through which the gripping fingers extend. The plates 13 are secured upon hollow shafts 16 journaled in the ends of the arms 3 and extending axially through the plates 9. Sheaves 17 are secured upon the outer ends of the shafts 16.

Plunger rods 18 are slidably mounted within the hollow shafts 16, said rods extending axially through the plates 9 and 13 and being provided with plunger discs 19 secured upon their inner ends. Springs 21 are mounted around the rods 18 between the discs 19 and the plates 13 to exert a pressure tending to normally move the discs 19 inwardly from the plates 13. Pins 22 are mounted upon the outer ends of the rods 18 to engage the outer ends of the shafts 16 to limit the inward movement of the plunger rods and discs. Locking cams 23 are pivotally mounted upon lugs 24 formed upon the ends of the arms 3, said cams extending through slots 26 and 27 formed in the arms 3 and the shafts 16 respectively and into engagement with the rods 18. Springs 28 are connected in any suitable manner to the cams 23 to normally hold said cams in locking engagement with the rods 18, said cams 23 being so shaped that when the rod is engaged by the cam, any movement of said rod outwardly away from the fruit will serve to wedge the cam more tightly against the rod and thereby effectively lock said rod against movement.

The slight pivotal movement of a locking cam 23 in the opposite direction operates to release its rod and permit it to be moved freely inwardly toward the fruit by its spring 21.

The carrier arms 3 are moved longitudinally with respect to the shaft 6 and hubs 4 by means of cams 29 rigidly secured upon the frame 1 and engaged by rollers 31 mounted upon the base portion of each arm 3. The cams 29 are shaped to cause the arms to be moved inwardly at a point substantially opposite the feeding mechanism 2, opposite arms being moved simultaneously toward the fruit from opposite sides thereof. As the arms 3 are moved inwardly toward the fruit, friction pads 32 mounted upon the frame 1 are engaged by the sheaves 17 to impart a partial rotation to the hollow shafts 16 and the actuating plates 13 whereby the spiral slots 14 cause the fingers 11 to be moved radially inward to engage opposite halves of a piece of fruit fed therebetween by the feeding mechanism 2. The frictional action of the pads 32 upon the sheaves 17 insures that the fingers will be moved into firm engagement with the fruit, regardless of the size and shape of the particular piece engaged, and at the same time permits a slippage between the pad and sheave whereby marring and injury to the fruit is avoided.

As the arms 3 are moved inwardly toward each other, the plunger locking cams 23 are engaged and moved by a suitable trip to release the rods 18 which have previously been moved by their springs 21 to their extreme extended positions. As the arms approach the fruit, the plunger discs 19 engage opposite sides of the fruit, the plungers thereby being held against further longitudinal movement and being pressed rearwardly through the hollow shaft against the pressure of the springs 21 as the arms are further advanced. The plungers are held in firm engagement with the fruit by the springs 21 and operate in conjunction with the fingers 11 to hold the fruit firmly in fixed position. When the fruit has been gripped the cam 23 is disengaged from its tripping means and moved by the spring 28 to lock the rod 18 against further movement.

The shaft 6 is rotated continuously while the machine is in operation, and the arms 3 are revolved and the gripping means actuated to pick up successive pieces of fruit delivered thereto by the feeding means. As each piece of fruit is picked up and gripped by the carrying and gripping means, it is carried past a rotating saw 34 mounted upon a shaft 33 mounted upon the frame 1 and arranged to cut entirely through the pulp and pit of the fruit completely halving the fruit. The saw is arranged to engage the fruit just after leaving the feeding means, and the fruit is fed and gripped in such a manner that the saw cuts through the fruit along the plane of suture of the pit. As the fruit passes the saw 34, the plunger locking cams 23 are momentarily tripped by any suitable tripping means to release the plungers to permit said plungers to be moved by their springs 21 to press the severed halves closely together in their normal relation. At the same time a friction pad 35 momentarily engages the sheaves 17 to tighten the fingers 11 onto the fruit to insure a firm gripping of the halves.

As the fruit is carried further it is moved into engagement with a pitting mechanism designated in general by the numeral 36 and operated in timed relation to the movement of the carrier to cut the halved pits from the fruit while still gripped and held in natural relation by the gripping means. The pitting mechanism is of the form and construction illustrated and described in my copending application, Serial Number 227,259 above referred to. As the specific structure of the pitting mechanism forms no part of the present invention, and as the said mechanism is fully and completely disclosed in said copending application, a detailed description of the mechanism is herein unnecessary other than that said mechanism consists of a pair of curved rotatable knives $36^a$ carried upon an oscillating arm $36^b$, said knives and arm being actuated to cause the knives to enter the cut upon one side of the halved peach, and to be rotated to sever the halved pits from the pulp, said knives being carried along the path of the fruit during the cutting movement of said knives. The halves of the fruit are firmly held in natural relation during the operation of the pitting knives, so that, while in the co-pending application, the fruit was presented to the pitting knives without severing the pit, the operation of said knives in removing the halved pits is unaltered.

As the fruit is carried past the pitting mechanism, the arms 3 are moved longitudinally apart along the shaft 6 and hubs 4, by means of the cams 29, and at the same time, the sheaves 17 are engaged by friction pads 37 operating to partially rotate the hollow shafts 16 and cam plates to move the gripping fingers 11 radially outward and thereby release the halves of the fruit. The locking cams 23 are also tripped by trips 40 to release the plunger rods 18, the plungers being moved inwardly by the springs 21 to their extreme inward positions thereby displacing the halves from the gripper fingers 11 in case the fruit has not previously dropped away from said fingers.

The machine is driven by a motor 38 geared or otherwise connected to the machine in any suitable manner as disclosed in the co-pending application above referred to.

The pairs of arms 3 with the gripping means carried thereby are moved succesively to pick up fruit and carry the same past the severing saw 34 and the pitting mechanism 36 so as to maintain a continuous operation wherein whole fruit is fed into one side of the machine and delivered halved and pitted upon the opposite side of the machine. The structure and operation of the improved gripping means is particularly important as the friction pads, operating to rotate the cams 13 whereby the gripping fingers are moved inwardly to engage the fruit, insure a positive grip, and at the same time prevents sufficient pressure to be applied to mar or injure the fruit. The pitch of the spiral slots 14 is such that the fingers are effectively held in gripping relation with the fruit until released by a rotation of the plate 13 in the releasing direction after the fruit has been pitted. The plungers 18 also play an important part as the fruit is firmly held in fixed position from the moment the arms start to move inwardly toward the fruit until the outward releasing movement after the pitting is complete.

The complete severing of the pulp and pit of the fruit by the saw 34 is important as it insures a uniform operation of the pitting mechanism whether the peaches fed to the machine have naturally split pits or not. In operating upon many varieties of peaches, split pits are found to be very common and much difficulty has heretofore been encountered in avoiding fouling the pitting knives by the abnormal thickness of pits when thus split. By sawing entirely through the peach, the halves of naturally split pits may be effectively pressed together by my improved gripping mechanism, and the action of the pitting knives thus rendered uniform for both split and unsplit pits.

While I have illustrated and described only the preferred embodiments of my improvements, it is understood that the structure may be modified in numerous ways without departing from the spirit of my invention. I therefore do not wish to restrict myself to the specific details of construction illustrated and described, but desire to avail myself of all modifications which may fall within the scope of the appended claims.

Having thus described my invention what I claim as new and desire to secure by Letters Patent is—

1. A peach pitting machine comprising feeding means; pit removing means; fruit carrying means arranged to receive fruit from the feeding means and move said fruit to the pit removing means; means for severing the fruit and pit while engaged by the carrying means; and means for holding the severed halves in natural relation and in contact with each other while the fruit is being moved to the pit removing means.

2. A peach pitting machine comprising pit removing means; fruit carrying means arranged to carry fruit into engagement with the pit removing means, said carrying means comprising oppositely disposed sets of gripping fingers; means for moving the fingers to grip opposite sides of fruit fed thereto; means for severing the fruit and pit while engaged by the fingers and before the fruit is presented to the pit removing means; and means engaging opposite sides of the fruit to press the severed halves together and maintain the same in natural relation while engaged by the pit removing means.

3. A peach pitting machine comprising pit removing means; fruit carrying means arranged to carry fruit into engagement with the pit removing means, said carrying means comprising oppositely disposed sets of yieldably movable gripping fingers; plungers mounted adjacent the gripping fingers and movable to press against opposite sides of the fruit; and means for severing the pulp and pit of the fruit while engaged by the carrying means and before being engaged by the pit removing means, the severed halves being held in natural relation by the gripping fingers and plungers.

4. A peach pitting machine comprising pit removing means; fruit carrying means arranged to carry fruit into engagement with the pit removing means, said carrying means comprising oppositely disposed sets of gripping fingers arranged to engage opposite sides of fruit fed thereto; plungers slidably mounted adjacent the gripping fingers and movable to press against opposite sides of the fruit held by said gripping fingers; and cutting means mounted adjacent the path of fruit carried by the carrying means and arranged to sever the pulp and pit of said fruit before said fruit is engaged by the pit removing means, the severed halves being held in natural relation by the gripping fingers and plungers.

5. A peach pitting machine comprising pit removing means; fruit carrying means arranged to carry fruit into engagement with the pit removing means, said carrying means comprising oppositely disposed sets of gripping fingers arranged to engage opposite sides of fruit fed thereto; plungers slidably mounted adjacent each set of gripping fingers and movable to press against opposite sides of the fruit held by said gripping fingers; and a rotatable saw mounted adjacent the path of fruit carried by the carrying means and arranged to sever the pulp and pit of said fruit before the same is engaged by the pit removing means, the severed halves being held in natural relation by the gripping fingers and plungers.

6. A peach pitting machine comprising pit removing means; fruit carrying means arranged to carry fruit into engagement with the pit removing means, said carrying means comprising oppositely disposed sets of gripping fingers arranged to engage opposite sides of fruit fed thereto; plungers slidably mounted adjacent each set of gripping fingers and movable to press against opposite sides of the fruit held by said gripping fingers; and a rotatable saw mounted adjacent the path of fruit carried by the carrying means and arranged to sever the pulp and pit of said fruit before the same is engaged by the pit removing means; and means for locking the plungers in engagement with the fruit to maintain the halves in natural relation while engaged by the pit removing means.

7. A peach pitting machine comprising pit removing means; fruit carrying means arranged to carry fruit into engagement with the pit removing means, said carrying means comprising oppositely disposed sets of gripping fingers arranged to engage opposite sides of fruit fed thereto; spring actuated plungers slidably mounted adjacent each set of gripping fingers, said plungers being yieldably movable to press against opposite sides of fruit held by the gripping fingers; fruit severing means arranged to halve the pulp and pit of fruit while being carried to the pit removing means; and plunger locking means arranged to lock the plungers in engagement with the fruit to maintain the halves in natural relation while the halved pit is being removed, said locking means being arranged to permit free inward movement of the plungers to displace the halved pulp from the gripping fingers after the pit has been removed.

8. In a peach pitting machine, a carrier comprising a plurality of sets of gripping fingers radially and axially movable to engage opposite sides of fruit fed thereto; and plungers slidably mounted in central relation to each set of gripping fingers and axially movable to press against opposite sides of fruit held by said fingers.

9. In a peach pitting machine, a carrier comprising a plurality of sets of gripping fingers radially and axially movable to engage opposite sides of fruit fed thereto; and spring actuated plungers slidably mounted in central relation to each set of gripping fingers and axially movable to press against opposite sides of fruit held by said fingers.

10. In a peach pitting machine, a carrier comprising a plurality of sets of gripping fingers radially and axially movable to engage opposite sides of fruit fed thereto; and spring actuated plungers slidably mounted in central relation to each set of gripping fingers and axially movable to press against opposite sides of fruit held by said fingers.

11. In a peach pitting machine, a carrier comprising a plurality of sets of gripping fingers radially and axially movable to engage opposite sides of fruit fed thereto; spring actuated plungers slidably mounted in central relation to each set of gripping fingers and axially movable to press against opposite sides of fruit held by said fingers; and means movable to engage and disengage the plungers in timed relation to the movement of the carrier.

12. In a peach pitting machine, a carrier comprising a plurality of sets of gripping fingers radially and axially movable to engage opposite sides of fruit fed thereto; spring actuated plungers slidably mounted in central relation to each set of gripping fingers and axially movable to press against opposite sides of fruit held by said fingers; and spring actuated clamping cams movable to engage and disengage the plungers in timed relation to the movement of the carrier.

13. In a peach pitting machine a fruit carrier comprising a plurality of sets of radially movable gripping fingers movable to engage opposite sides of fruit fed thereto; and axially movable plungers centrally disposed with respect to each set of fingers to press against opposite sides of the fruit, said fingers and plungers being arranged to hold the fruit in natural relation while the pit is removed therefrom.

14. In a peach pitting machine a fruit carrier comprising a plurality of sets of radially movable gripping fingers movable to engage opposite sides of fruit fed therebetween; an axially movable plunger slidably mounted in central relation to each set of fingers; and a spring mounted in connection with each plunger to press said plungers against opposite sides of the fruit to hold the fruit in natural relation while the pit is removed therefrom.

15. In a peach pitting machine a fruit carrier comprising a plurality of sets of radially movable gripping fingers movable to engage opposite sides of fruit fed therebetween; an axially movable plunger slidably mounted in central relation to each set of fingers; a spring mounted in connection with each plunger to press said plungers against opposite sides of the fruit to hold the fruit in natural relation while the pit is removed therefrom; and locking means arranged to engage and lock the plungers in engagement with the fruit and to release said plungers to displace the fruit from the gripping fingers in timed relation to the movement of the carrier.

16. In a peach pitting machine, the combination with feeding means and pit removing means, of a carrier arranged to carry fruit from the feeding means to the pit removing means, said carrier being provided with means for engaging opposite halves of the fruit and maintaining said halves in natural relation and in contact with each other while the pit is being removed; and means for halving the pulp and pit of the fruit while engaged by the carrier.

17. In a fruit pitting machine, a carrier comprising a plurality of oppositely disposed sets of gripping fingers; and frictional means for moving said fingers radially to engage opposite sides of fruit fed therebetween.

18. In a fruit pitting machine, a carrier comprising a plurality of carrier arms; sets of gripping fingers slidably mounted upon the ends of the arms, said sets being arranged in oppositely disposed pairs; spirally slotted actuating plates engaging the fingers; and frictional means for partially rotating the actuating plates to move the fingers radially to engage and disengage fruit fed therebetween.

In witness whereof, I hereunto set my signature.

ALBERT STANLEY RIDLEY.